July 3, 1956 R. D. LA PENTA 2,752,788
WHEEL BALANCER

Filed April 22, 1954 2 Sheets-Sheet 1

INVENTOR.
Rocco D. La Penta
BY Nathaniel Frucht
atty

July 3, 1956

R. D. LA PENTA 2,752,788

WHEEL BALANCER

Filed April 22, 1954

INVENTOR.
Rocco D. La Penta
BY
Nathaniel Frucht
atty

United States Patent Office 2,752,788
Patented July 3, 1956

2,752,788

WHEEL BALANCER

Rocco D. La Penta, Dover, Mass.

Application April 22, 1954, Serial No. 424,920

3 Claims. (Cl. 73—487)

The present invention relates to instruments for determining unbalance of a wheel assembly, and has particular reference to a novel platform and support shaft assembly therefor.

The principal object of the invention is to provide a novel portable platform and wheel balance support shaft assembly.

A further object of the invention is to provide a support shaft which is adapted to mount a wheel for free rotation in a vertical plane, whereby unbalance can be accurately determined without inaccuracies resulting from brake drag, support shaft flexing and the like.

Another object of the invention is to provide a platform mounting for a wheel balancer support shaft, which permits the shaft to horizontally align itself.

An additional object of the invention is to provide a simple wheel locking arrangement for ensuring seating of the wheel on the support shaft in axial alignment with the support shaft.

With the above and other objects and advantageous features in view, the invention consists of a novel arrangement of parts more fully disclosed in the detailed description following, in conjunction with the accompanying drawings, and more specifically defined in the claims appended thereto.

Figures 1, 3:
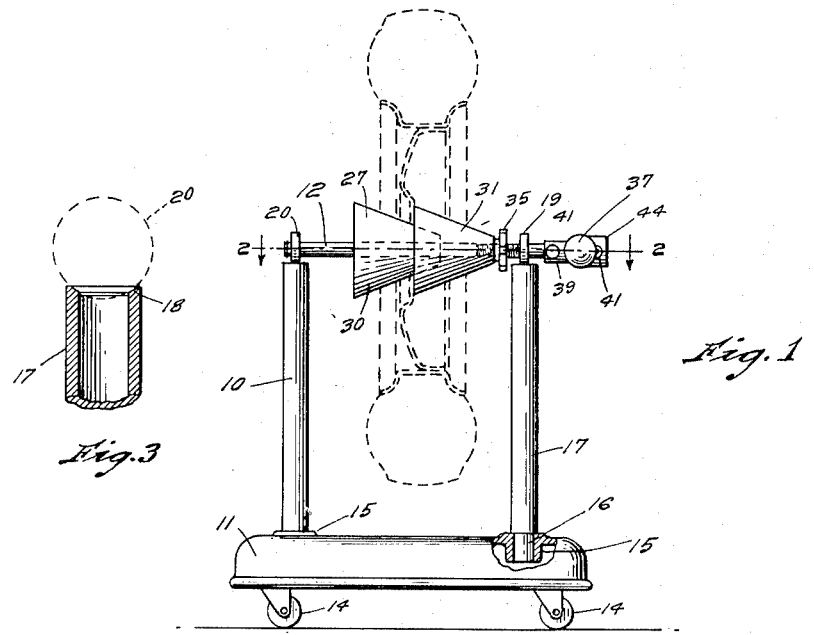
Fig. 1 is an elevation, partly broken away, of an illustrative platform and balance wheel support shaft assembly embodying the invention.
Fig. 3 is an enlarged sectional detail of the upper end of a shaft support column.

It has been found desirable to provide a platform and balancer wheel support shaft assembly of simple construction, which will accurately disclose wheel unbalance and will indicate the amount and location for compensating weights. To this end, I provide a platform which preferably has casters for permitting postage of the assembly wherever required, and I mount a balancer wheel support shaft on ball bearings centered on upright platform columns in self-aligning relation, whereby the support shaft adjusts itself into horizontal axial alignment. I secure a fixed cone axially on the shaft, whereby a wheel may be set over the shaft to seat on the fixed cone, and I then move a lock cone to engage the wheel and hold it in circular contact with the fixed cone and in axial alignment with the shaft, whereby the wheel and shaft may freely turn. I mount a calibrated bar on one end of the shaft, the bar carrying a slidable weight which may be manually shafted to exactly balance the wheel, whereupon a location indicator is set on the weight, the weight being centered, to disclose the proper location for the compensating weights. The entire procedure is thus simple, the wheel being fully balanced to eliminate out-of-balance vibration and resulting tire wear.

Referring to the drawings, the novel platform and support shaft assembly 10 includes a platform 11 and a support shaft 12. The platform 11 is preferably of metal such as aluminum or pressed steel, is rectangular in shape, and is provided with a number of pockets 13 for holding wheel weights; the platform has depending caster brackets in which casters 14 are mounted, whereby the platform is readily moved to a desired location.

The platform is provided with a flanged socket or cup 15 at each end adapted to slide receive the reduced lower ends 16 of vertical standards 17, which are preferably tubular, and have their upper ends 18 bevelled concavely inwardly as illustrated in Fig. 3. The two standards 17 are thus firmly held in parallel vertical relation, see Fig. 1.

The shaft 12 has an anti-friction ball bearing 19 slidably mounted at each end, the outer ball bearing shell 20 being cylindrical, whereby the shells are adapted to be set over the bevelled upper ends of the platform standards 17 to self-seat with the shaft 12 in horizontal position. The outer end 21 of the shaft has an annular groove 22, see Fig. 4, into which a flat coil spring 23 snaps to serve as an end abutment for the associated ball bearing 19.

Figure 4:
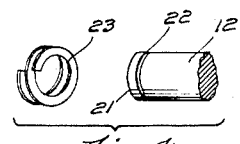
Fig. 4 is an enlarged perspective detail of a portion of the shaft, with an associated spring lock clip.

A small cone 24 of solid type has an axial bore 25 and is slidably mounted on the shaft, a spring clip abutment 26 of the type shown in Fig. 4 and similarly seated in an annular shaft groove serving to hold the cone against outward sliding movement. A hollow cone 27 has a solid upper portion 28 with an axial bore 29 slidably mounted on the shaft, to abut against the cone 24. The outer surface 30 of the cone 27 is the bearing surface for a wheel to be balanced, as indicated in dotted lines in Figs. 1 and 2, the wheel disk flange engaging the outer cone surface.

A second hollow cone 31 with a solid upper portion 32 and an axial bore 33 is also slidably mounted on the shaft, the outer edge 34 of the second cone engaging the wheel disk flange to set the wheel vertically on the shaft and to hold it in place, a hand wheel 35 being threaded on a threaded portion 36 of the shaft to releasably lock the cones and wheel disk flange together.

A weight calibrator device 37 is detachably mounted on the other end 38 of the shaft, and includes a central bearing 39 in the form of a tubular extension adapted to slide seat over the shaft end 38, the extension having set screws 41 threaded thereinto for gripping onto the shaft end.

Figure 2:
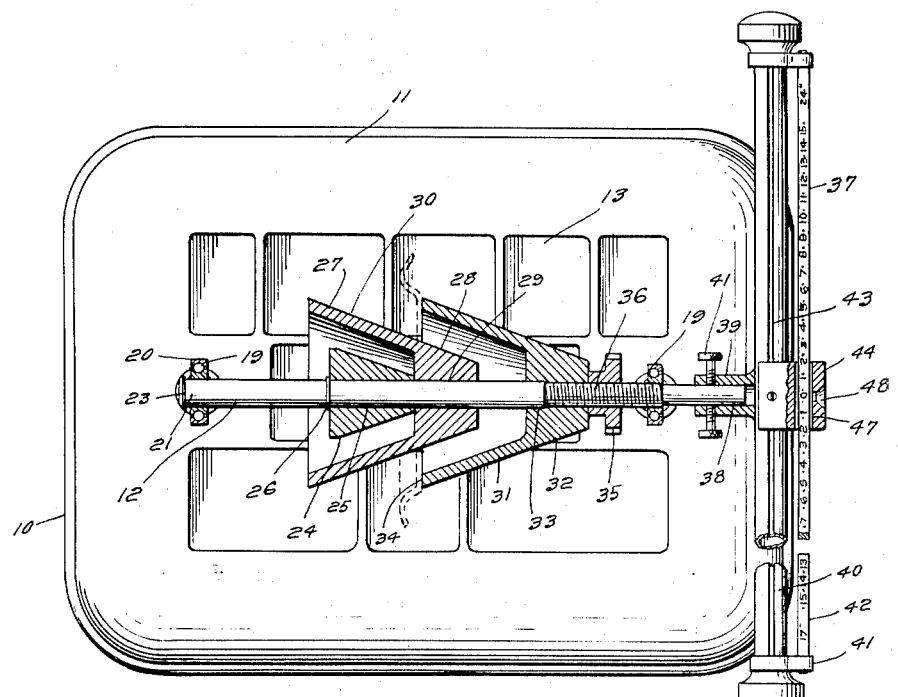
Fig. 2 is an enlarged horizontal section of Fig. 1 on the line 2—2 thereof.

The bearing 39 is secured, as by welding, to the center of a tubular calibrator frame 40, which has end brackets 41 mounted thereon for rotatably receiving the ends of a square calibrator rod 42. As shown in Fig. 2, the frame 40 has a longitudinal slot 43 which has a depression centrally located intermediate the frame ends, whereby a weight 44, see Fig. 10, with a bore 45 is slidably mounted on the frame, and has a spring pressed ball 46 slidably engaging the slot 43 and adapted to snap seat in the center depression 43a when centered on the frame. The weight 44 has a second bore 47 through which the rod 42 extends.

Figure 6:
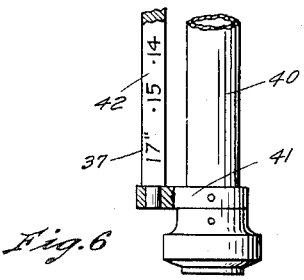
Fig. 6 is an enlarged detail of the lower end of the balancer beam and its calibrated bar.

The rod 42, see Fig. 6, has calibrations on all four sides, corresponding to different wheel sizes, each end having indicia, for example 14", 15", 16" and 17" for automobile wheels, or indicia such as 18", 20", 22" and 24" for truck wheels, the rod sides being graduated with numbers corresponding to balancing weights.

Figure 5:
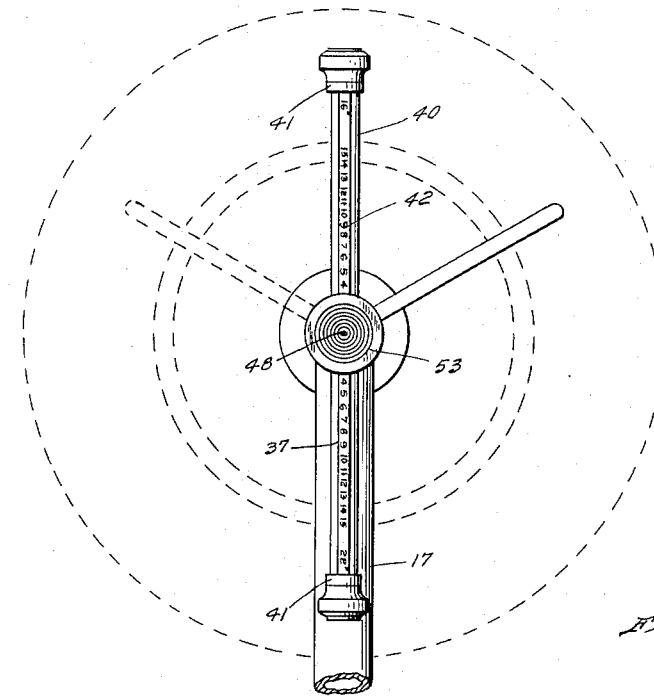
Fig. 5 is an elevation of the balancer beam and its associated parts.
Figure 10:
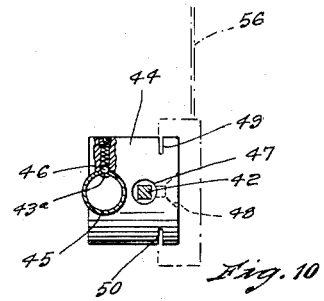
Fig. 10 is a sectional detail of the balancer beam sliding weight.

As shown in Fig. 5 and indicated in dotted lines in Fig. 10, the weight 44 has an opening 48 through which the rod weight numbers can be seen, and has side slots 49, 50 for receiving parallel flanges 51, 52 of a location indicator 53.

Figure 7:
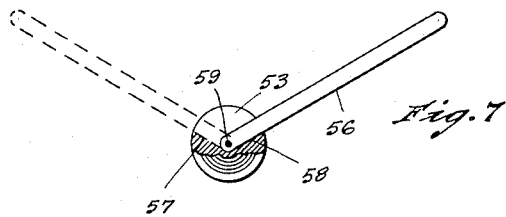
Fig. 7 is a view, partly broken away, of the weight location indicator.
Figure 8:
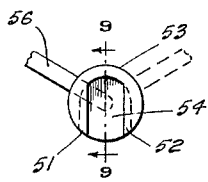
Fig. 8 is a rear view of the location indicator housing.
Figure 9:
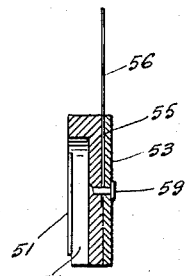
Fig. 9 is an enlarged section on the line 9—9 of Fig. 8.

The location indicator 53, see Fig. 9, has a rear recess 54 to seat over the front of the weight 44, with the flanges 51, 52 sliding into the slots 49, 50, and has a vertical slit 55 in which a pivoted direction arm 56 may swing, see Fig. 7, the slit 55 having lower edges 57, 58 at 120 degrees to each other and serving as stops for the arm 56, and the pivot 59 of the arm 56, permitting free swing of the arm 56 from one stop to the other.

The procedure in balancing a wheel may now be explained. The wheel is set on the shaft to seat on the fixed hollow cone 37; the second cone 31, the hand wheel 35, and the right end roller bearing 19 are set on the shaft, and the two roller bearings 19 are set on the platform standards 17. The hand wheel 35 is now turned to press the second cone 31 against the wheel flange and to lock the wheel flange against the outer surface of the fixed hollow cone, the roller bearings aligning the shaft, whereby the shaft is horizontal and the wheel is in a vertical plane with its axis in line with the shaft axis.

The calibrator device is now mounted on the right shaft end, the weight 44 being central. The rod 42 is turned to bring the indicia for the size of the wheel to the front, and the wheel is moved so that it will freely swing until the heavy spot settles to the bottom; the calibrator frame is now set vertical. The location indicator 53 is now set on the weight 44. The arm 56 is turned to the right and the wheel marked, and is turned to the left and wheel marked. The location indicator is now removed.

The assembly is now turned to bring the calibrator frame horizontal, and the weight 44 is shifted to equalize the heavy spot on the wheel. The equalizing weight is now read off through the weight center opening.

One-half the indicated equalizing weight, or 3 oz. is placed on the wheel at the points of each marking; and 3 oz. is also placed at the other side of the wheel, at the same indicated positions. The wheel now has two 6 oz. settings at 120 degrees from the wheel weighted section, and the wheel is balanced and will run free of vibration.

Although I have described a specific construction embodiment of my invention, it is obvious that changes in the size, shape and arrangement of the parts may be made to meet different wheel balancing requirements, without departing from the spirit and the scope of the invention as defined in the appended claims.

I claim:

1. A calibrator device for a wheel balancer, comprising an elongated frame, a bracket at each end of the frame, means for attaching the frame to a wheel, a weight indicia rod rotatably mounted in the brackets in spaced parallel relation to the frame, and a weight element slidably mounted on the frame and having a bore through which the rod rotatably extends.

2. In the combination of claim 1, said frame having a longitudinal slot and said weight element having a spring-pressed part slidably seated in the slot.

3. In the combination of claim 2, said slot having a depression centrally of the frame ends for releasably receiving the spring-pressed part of the weight element.

References Cited in the file of this patent

UNITED STATES PATENTS

| | | |
|---|---|---|
| 13,142 | Sykes | June 26, 1855 |
| 407,589 | Griffin | July 23, 1887 |
| 1,437,798 | Flanders | Dec. 5, 1922 |
| 2,201,982 | Bazarek | May 28, 1940 |
| 2,313,339 | Hare | Mar. 9, 1943 |
| 2,319,655 | Bennett | May 18, 1943 |
| 2,565,577 | Schnoebelen | Aug. 28, 1951 |
| 2,613,533 | Jones | Oct. 14, 1952 |